UNITED STATES PATENT OFFICE.

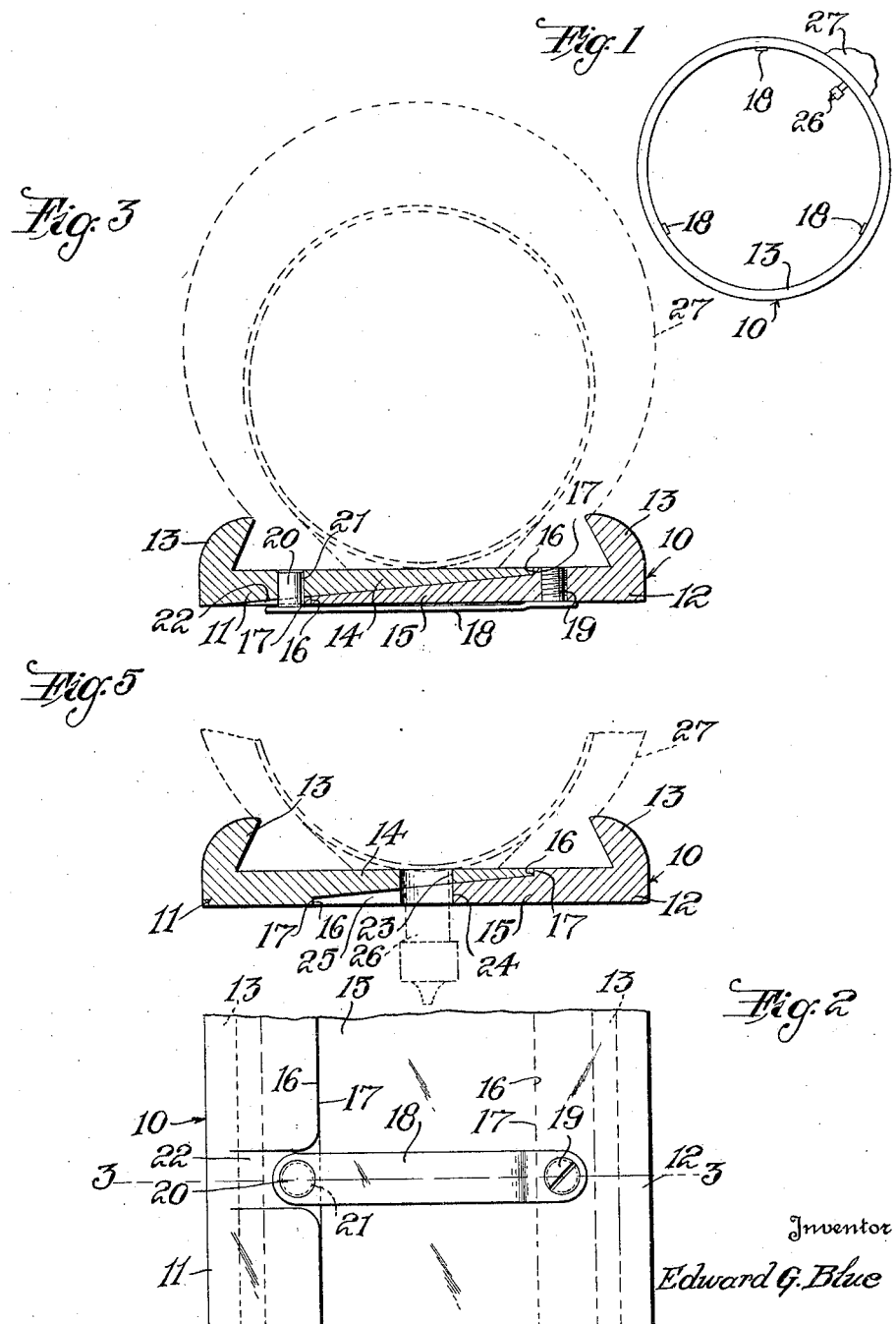

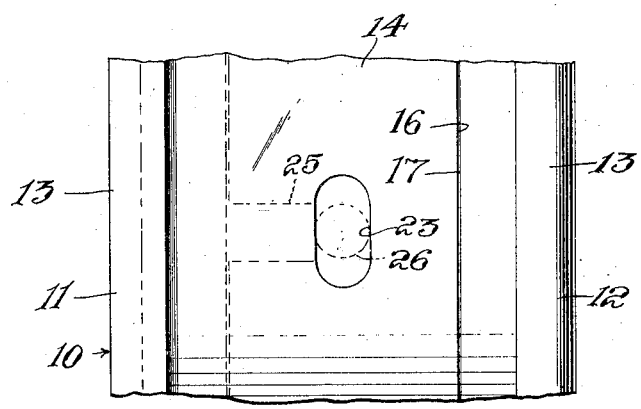
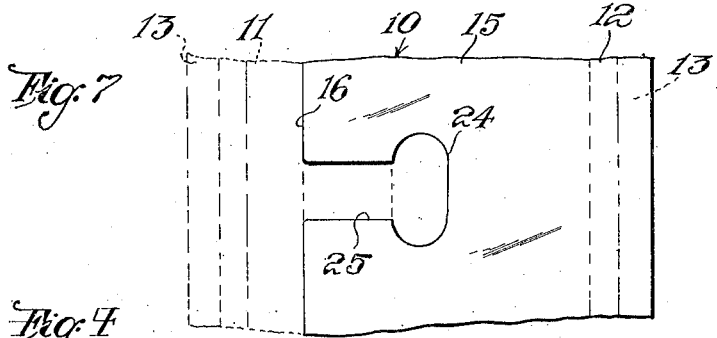
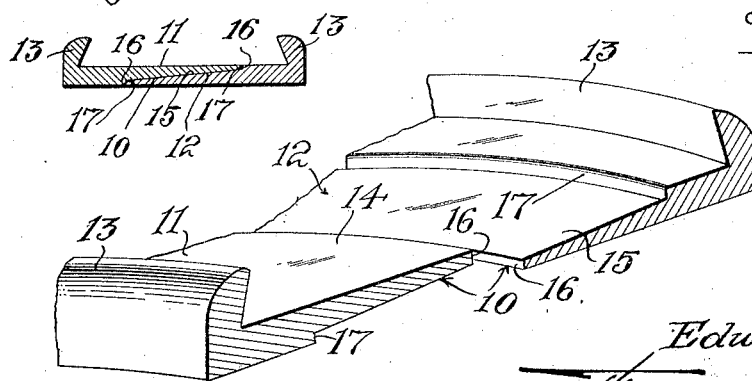

EDWARD G. BLUE, OF GRAPE CREEK, ILLINOIS.

DEMOUNTABLE RIM.

1,392,292.     Specification of Letters Patent.     Patented Oct. 4, 1921.

Application filed June 14, 1920. Serial No. 388,997.

*To all whom it may concern:*

Be it known that I, EDWARD G. BLUE, a citizen of the United States of America, residing at Grape Creek, in the county of Vermilion and State of Illinois, have invented certain new and useful Improvements in Demountable Rims, of which the following is a specification.

My present invention relates generally to demountable rims for automobile and other wheels, my object being the provision of a two part rim construction capable of ready assembly and disassembly so as to permit of easy, quick tire change, and a further object is the provision of a strong, durable construction which in its position on a wheel felly will be positively held against accidental displacement of its parts.

In the accompanying drawing which illustrates my invention and forms a part of this specification, Figure 1 is a side view of my improved rim with a tire thereon, Fig. 2 is a plan view looking at the inner periphery of a fragmentary portion of the rim adjacent to one of the rim holding catches, Fig. 3 is a cross section taken on line 3—3 of Fig. 2, Fig. 4 is a cross section through the rim at a point between catches, Fig. 5 is a cross section through the rim adjacent to the valve tube of the tire, Fig. 6 is a plan view of the inner face of a fragmentary portion of one of the rim sections adjacent to the tire valve tube, and Fig. 7 is a similar view of the adjacent portion of the other rim section.

Fig. 8 is a perspective view of a portion of the rim showing the two sections in detached relation.

Referring now to these figures my invention proposes a tire holding rim 10 of demountable nature which as seen in Figs. 3, 4 and 5 includes a pair of circular laterally engageable and disengageable sections 11 and 12, each having a tire bead engaging flange 13 around its outer edge. These sections are provided with oppositely beveled inner overlapping portions 14 and 15, and each has its inner edge terminating in a flat surface abutting an annular shoulder 17 of the other section.

This construction and arrangement provides for an inner flat periphery for the entire rim formed for the major part by the inner flat face of the section 12, the two sections being held with their inner edges 16 and shoulders 17 in laterally abutting relation in the operative position by means of flat spring catches 18 disposed transversely of the inner periphery of the rim at circumferentially spaced points, one end of each of which catches is securely fastened as by means of a rivet or screw 19 to the inner face of the section 12, and the opposite end having an outwardly projecting stud 20 for movement into a radial opening 21 conformably placed in the section 11. This stud carrying end of the spring catch 18 is free to flex inwardly when the rim is removed from a wheel felly, as will be seen by comparison of the full and dotted lines of Fig. 3, to permit of withdrawal of the stud 20 from the receiving aperture 21 of the section 11, and it will be noted from Fig. 2 that at a point opposite each spring catch 18 of the section 12, the shouldered inner face of the section 11 is grooved as at 22, the groove extending through its shoulder 17 and of a width adapted to snugly receive the free end of the spring catch 18 in interfitting relation. The side walls of each of the grooves 22 moreover merge into the shoulder 17 by means of curved surfaces as seen in Fig. 2 so as to effectively guide the free ends of the spring catches 18 into proper position when the rim sections are shifted laterally with respect to one another into assembled relation.

At one point the rim section 11 has a circumferentially slotted opening 23 between its side edges and at a point opposite this opening the section 12 has a similar slotted opening 24 intermediate its side edges, adapted to register with the slot 23 and communicating with its inner edge by means of a transverse slot 25 so as to thus provide for the reception of a tire valve tube 26 of a tire 27 the latter of which has been previously introduced through the opening 23 of section 11.

Thus in operation upon removal of a rim constructed as above, from a wheel felly it is simply necessary to flex the spring catches inwardly for the purpose of withdrawing their latching studs 20 from the apertures 21 of the section 11, in order to permit of relative lateral movement of the two sections away from one another, to effect their disassembly, upon which the tire 27, remaining with the section 11 by virture of the extension of its valve tube through the slotted opening 23, may be readily removed. In reassembly the tire is first placed on the section 11 with its valve tube extending through the slotted opening 23 and the section 12 is then shifted laterally into engagement with the section 11, with its spring caps 18 in alinement with the inner transverse grooves 22 of the section 11 so that the free ends of the spring caps will be effectively guided into proper position for their studs 20 to spring into the apertures 21.

It is thus obvious my invention provides a two part demountable rim, the parts of which automatically lock as they are shifted together in operative relation, and the locking means of which are not only effectively guided into operative position but are so disposed as to be positively locked against accidental displacement when the rim is on a wheel felly.

I claim:

A demountable rim comprising a pair of cylindrical sections having inner oppositely beveled overlapping portions terminating in flat edges, said sections having annular shoulders receiving the flat edges of the beveled inner portions laterally abutting relation in the operative position and being also provided with flanged outer edges and with slotted valve tube receiving openings, one of said sections having circumferentially spaced transversely extending spring catch pieces secured at one end thereto and provided with outwardly projecting locking studs at their free ends, and the other of said sections being provided with apertures to receive the studs and also provided upon its inner face with transverse grooves into which the inner ends of the apertures open, said grooves extending through the annular shoulder of said section and having the side walls thereof merging into the shoulder along curved lines to form guides for the free ends of the said spring catches when the two sections are shifted laterally into effectively abutting relation.

In testimony whereof I have affixed my signature.

EDWARD G. BLUE.